March 30, 1943.   R. W. PALMER   2,315,270

HYDRAULIC CONTROL SYSTEM FOR AIRCRAFT

Filed Feb. 26, 1941

Richard W. Palmer INVENTOR.

BY James M. Clark.

His Patent Attorney

Patented Mar. 30, 1943

2,315,270

UNITED STATES PATENT OFFICE 2,315,270

HYDRAULIC CONTROL SYSTEM FOR AIRCRAFT

Richard W. Palmer, Whittier, Calif., assignor to Vultee Aircraft, Inc., a corporation of Delaware Application February 26, 1941, Serial No. 380,621

8 Claims. (Cl. 60—54.5)

The present invention relates to hydraulic control systems and more particularly to improvements in co-ordinating and synchronizing movements of the pilot control and the control surfaces of aircraft.

Hydraulic control systems have not been used to a very great extent in small aircraft but have been found desirable from the standpoint of their positive action and their ease of maintenance. These systems also have the advantage that they may be installed within restricted spaces. Quite frequently, however, these systems have been troublesome due to leakage of the fluid in the system past the cylinders or other moving parts. These and other causes have contributed to such systems frequently getting out of the synchronous relationship of the control element with respect to the control surface. These disadvantages have been overcome by the present invention which comprises the manual or automatic replenishment of the required amount of hydraulic fluid to that side of the system from which it has passed. It also contemplates the provision of an electrical synchronizing gear which automatically maintains the proper synchronism between the pilot control and the control surface.

It is accordingly a major object of the present invention to provide synchronizing gear for a hydraulic control system. It is also an object to provide an automatic electric synchronizing gear which is light in weight, economic to operate and which is readily adapted to the conventional aircraft control elements. It is a further object to provide a positive acting control system which is easily maintained and which will instantly compensate for any variation from perfect synchronism of the pilot control and the surface.

Other objects and advantages will occur to those skilled in the art after a reading of this description and the following drawing forming a part hereof, in which.

Figure 3:
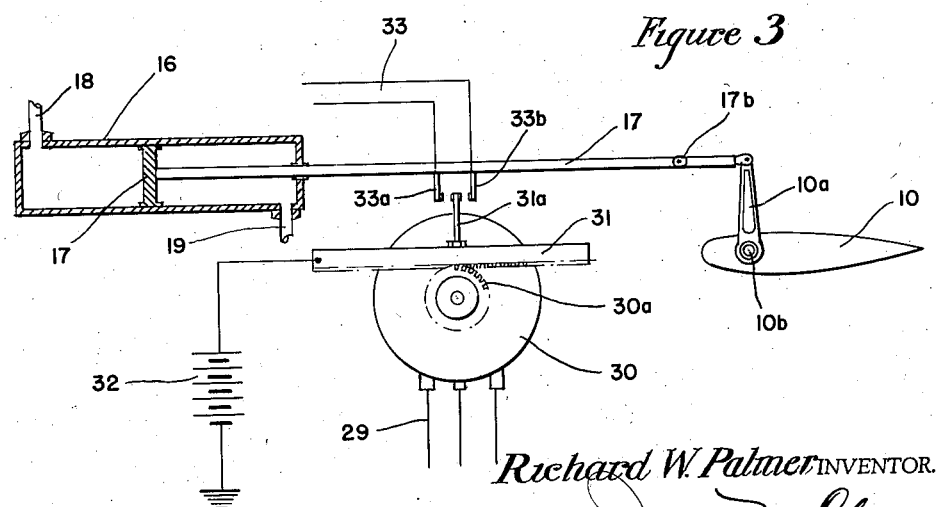

Fig. 3 in an enlarged detail shows the actuating and synchronizing apparatus adjacent to the surface being controlled.

Figure 1:
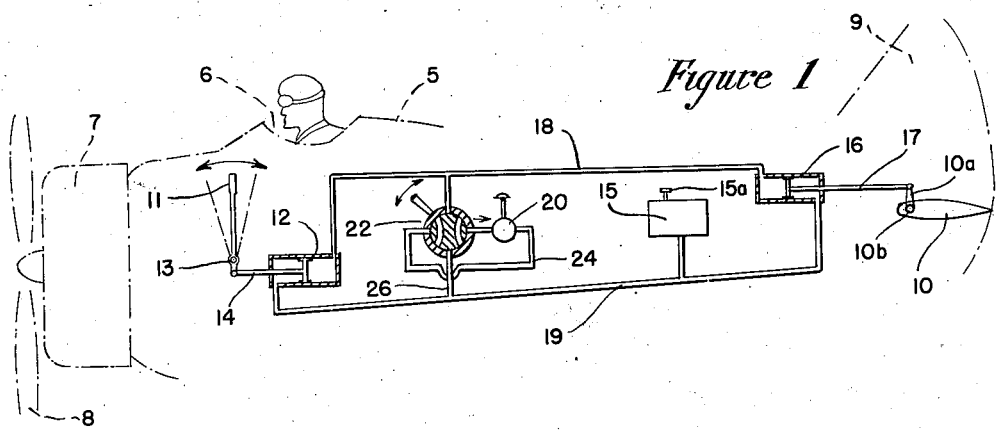
Fig. 1 shows a diagrammatic view of a simple hydraulic synchronizing system applied to an airplane.

Referring now to Fig. 1 there is shown in outline an airplane 5 having a pilot's cockpit 6 and a cowled power plant 7 driving the propeller 8. For purposes of simplifying the explanation of the present invention the application of the present improvements to the elevator control surface only will be explained. It will be obvious that the other two basic controls of the airplane, namely the ailerons and the rudder for lateral and steering control, respectively, can be similarly operated. It should also be noted that while the invention has been shown as used on a relatively small airplane, it is not restricted thereto. As used on larger aircraft it preferably would embody a hydraulic booster or other means to increase the pilot control forces by suitable hydraulic or mechanical advantage means.

The airplane 5 is provided with a conventional empennage 9 and the usual horizontally disposed elevator control surface 10. The elevator is pivotally mounted upon the aircraft structure at 10b and is provided with an operating arm or horn 10a adapted to be controlled by the pilot's movement of the control stick 11. A hydraulic control cylinder 12 is provided with a piston 14 which is pivotally connected to the lower end of the control stick 11 which is rockable about the pivot 13. An accumulator 15 serves as a reservoir for the oil or other hydraulic fluid, and the accumulator also preferably includes a piston or other means (not shown) to maintain a predetermined pressure within the hydraulic system.

In the rear portion of the airplane in the region of the elevator 10 there is provided a servo-cylinder 16 having its piston 17 pivotally connected to the outer extremity of the control horn 10a. The cylinder 16 is either pivotally mounted to permit the rod 17 to follow the rotation of the arm 10a or the piston rod may be jointed as at 17b in the modification shown in Fig. 3. A fluid conduit 18 connects the rear portion of the control cylinder 12 with the front portion of the servo-cylinder 16 and similarly a fluid conduit 19 connects the forward portion of the cylinder 12 with the rear portion of the cylinder 16. The supply line from the accumulator 15 is open to the line 19, and a suitable filling connection and air vent is provided through the top of the accumulator at 15a. The entire system is filled with fluid and suitable vent connections provided where necessary to expel any air which might become trapped in the system.

A master valve 22 is provided intermediate the ends of the branch conduit 26 which connects the conduits 18 and 19 and provides a means for permitting fluid to flow from one side of the system to the other. The valve 22 is provided with four ports, two opposing ports being open to the branch conduit 26 and the intermediate ports being connected in circuit with the fluid conduit 24 within which is disposed the manually operated hydraulic pump 20. By rotating the handle of the master valve 22 to any one of its three positions the fluid can either be prevented from passing from one side of the system to the other, or be caused to flow from either to the opposite side.

In the closed position of the valve shown in Fig. 1 the branch pipe 26 is closed and fluid cannot flow from conduit 18 to 19, or vice versa, despite the operation of the pump 20 the suction and discharge lines of which are also closed off. When the valve handle is rotated in a clockwise direction from that shown in Fig. 1 the conduit 19 becomes opened to the suction side of the pump 20 and when the pump is operated this fluid is caused to flow to the right in the direction of the arrow and down through the conduit 24 to the other side of the valve 22 and into the conduit 18. On the other hand, when the valve 22 is rotated in a counter-clockwise direction, conduit 18 is opened to the suction side of the pump 22 and the fluid is caused to flow through the conduit 24 back through the other ports in the valve and out the branch pipe 26 into the conduit 19.

In operating the hydraulic control system shown in Fig. 1 it is only necessary that the pilot rock the control stick 11 in the conventional manner. Assuming that the control stick 11 is pushed forwardly about the pivot 13 the piston 14 moves rearwardly within the cylinder 12 expelling fluid out of the rear chamber through the conduit 18 and into the front portion of the servo-cylinder 16 causing the piston 17 to move rearwardly and rotate the elevator 10 downwardly to an extent which is determined by the angle through which the control stick is rotated. In moving rearwardly the piston 17 causes fluid to be expelled from the rear portion of the servo-cylinder 16 and to be forced through the conduit 19 into the front portion of the control cylinder 12 in which the pressure has been reduced in the forward portion by the rearward movement of the piston 14. Although the pistons in both cylinders are provided with the customary piston rings to cause the pistons to fit the cylinders closely, in the course of frequent operation the fluid works past the pistons and produces an asynchronous state of the system. In the system shown, in its balanced neutral condition, the pressure within the conduit 18 will be slightly less than that in conduit 19 due to the reduction in piston area by the piston rod. In an alternative arrangement where the pressures would be the same the piston rods would extend through both ends of the cylinders.

When the pilot finds that the elevator is biased in one direction or the other from its normal position when the control stick is in the neutral position, he rotates the handle of the valve 22 to permit fluid to be pumped into that side of the system which will bring the elevator back to its neutral position. For example, should he find that, with the stick in neutral, the elevator is turned upwardly slightly beyond its neutral position, he would rotate the handle of the valve 22 in a clockwise direction and operate the manual pump 20 thereby pumping fluid from the conduit 19 out through the conduits 24 and 26 into the conduit 18. This causes increased pressure within the forward portion of the servo-cylinder 16, moving the piston 17 rearwardly, and thereby returning the elevator to its neutral position, at which the valve 22 is again turned into its "off" position as shown in Fig. 1.

Figure 2:
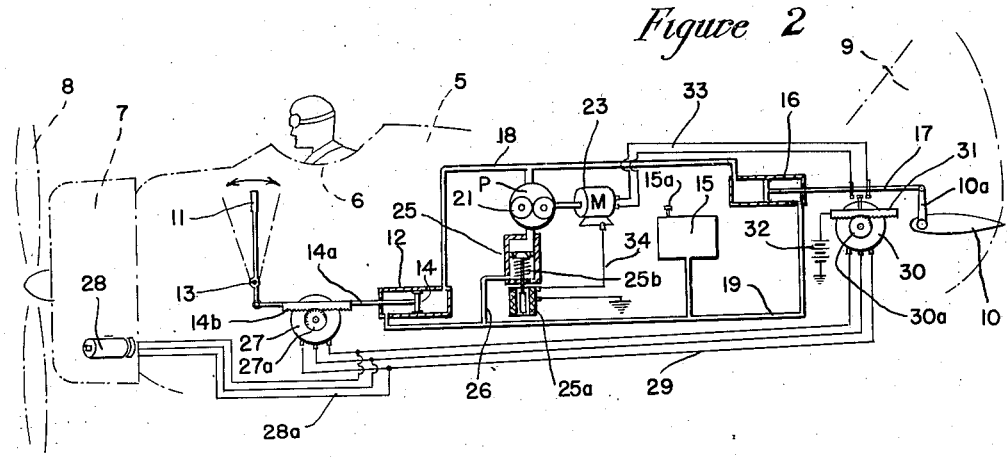
Fig. 2 shows diagrammatically an automatic electric synchronizing system.

Referring now to Fig. 2, there has been added to the manual synchronizing system shown in Fig. 2, an automatic electric synchronizing mechanism. A reversible pump P has been substituted in the branch pipe 26 for the manual pump shown in Fig. 1. The gears or rotors 21 of the pump P are driven by a reversing motor 23, the power supply leads 33 of which are connected with two spaced contacts 33a and 33b (see Fig. 3) on the piston rod 17 of the servo-cylinder 16. The piston rod 17 is preferably jointed at 17b in order that the cylinder 16 may be fixedly supported on the aircraft and that the outer end of the rod may follow the path of the control arm 10a. Another lead 34 is carried from the motor to the coil 25a of the solenoid valve 25. The movable element of the valve is normally maintained in its closed position by the action of the compression spring 25b thereby closing the conduit 26 through the pump P and preventing flow from one side of the system to the other. On the piston rod 14a of the control cylinder 12 there is provided a rack 14b which meshes with a pinion 27a of the synchronous motor 27 which will be referred to as the "autosyn" transmitter. A similar rack 31 is suitably guided for rectilinear movement parallel to the piston rod 17 and has its teeth in mesh with the pinion of the synchronous or "autosyn" motor 30. The three power supply leads 29 interconnect the transmitter and driven motors 27 and 30 and a suitable source of alternating current of the desired frequency and voltage is provided by the alternating current generator 28 preferably driven by the aircraft power plant 7 and supplying current to the "autosyn" system through the three supply wires 28a.

The aforementioned reversing motor 23 may be of the direct current type having its electric power furnished by the battery 32 which is grounded at one terminal to the structural framework of the aircraft and connected at the other through a flexible lead to the movable rack 31. The adjacent portions of the supply leads 23 connected to the contacts 33a and 33b, which move with the piston rod 17, are also of a flexible nature. The heads 33a and 33b are opposed and relatively closely spaced, and a similar double-faced contact 31a, fixed to the rack 31 is arranged to be disposed between the contacts 33a and 33b such that a predetermined amount of relative movement between the piston rod 17 and the rack 31 will result in 31a making contact with either 33a or 33b. The remainder of the hydraulic system comprising essentially the control cylinder 12 and the servo-cylinder 16, interconnected by the conduits 18 and 19 and supplied from the accumulator 15 are identical with the correspondingly numbered portions of the system shown in Fig. 1.

As in the case of the system shown in Fig. 1, rocking of the control stick 11 in Fig. 2 will also result in similar and corresponding movement of the elevator 10. Likewise rotation of the "autosyn" transmitter 27 resulting from movement of the piston rod 14a, and the rack 14b meshing the pinion 27a, causes identical rotation in the same direction of the synchronous motor 30, and the pinions 27a and 30a being identical, the rack 31 is moved in perfect synchronism with the rack 14a. If it now be assumed that for some reason fluid had leaked from the conduit 18 past the piston 14 of the control cylinder 12, there would be a tendency of the pistons 14 and 17 to move slightly toward the ports connected to the conduit 18, or toward the line in which the volume of the fluid has been reduced.

In returning the control stick 11 to its neutral position, which has the effect of also returning the piston 14 to its mid-position, the piston 17 tends to move forwardly to a still greater extent due to the fluid within the conduit 18 flowing into the cylinder 12 to follow-up the forward movement of the piston 14. Since however, the control stick 11 is now in its neutral position, the transmitter 27 has also caused the synchronous motor 30, and the stop 31a on the rack 31, to be returned to its mid-position. When the piston and rod 17, however, has moved forwardly to such an extent that the contact 33b engages the contact 31a on the rack 31, current is caused to flow from the battery 32 through the rack 31 and the engaged contacts 31a and 33b through the upper or outer lead 33 to the motor 23, back down through the grounded leg 34 in series with the coil 25a of the solenoid valve 25. This flow of current through the motor 23 initiates rotation in a direction which also causes the rotors 21 of the pump to draw fluid from its lower side and discharge the same into the upper conduit 18. At the same time the flow of current through the solenoid coil 25a causes the valve to be unseated, or drawn downwardly against the spring 25b, permitting fluid to be drawn upwardly through the interconnecting conduit 26. This correcting flow of fluid into the upper conduit causes the piston 17 to be forced rearwardly restoring the elevator 10 to its neutral position, at which contact between 31a and 31b is again interrupted and the motor 23 ceases to rotate. At the same instant the solenoid valve 25 is released and caused to close under the pressure of the spring 25b.

The automatic synchronization system shown in Fig. 2 will serve to compensate for any leakage of fluid from either side of the hydraulic system to the other regardless of whether the control surface is in its neutral, or extreme positions of rotation. Since the rack 14b moves with the piston rod 14a and imparts identical movement to the rack 31 through the "autosyn" system, any failure of the piston 17 to assume an identical position corresponding to that of the piston 14a, will result in either the advancing, or following, contact closing the circuit through the rack contact 31a, resulting in immediate compensating flow across the interconnecting conduit 26, and the balance or synchronization of the system is again restored.

Other advantages and modifications both in general arrangement and detail design which may occur to those skilled in the art after a reading of the present specification are intended to fall within the scope and spirit of this invention as more fully defined in the appended claims.

I claim:

1. In an hydraulic control system for aircraft having a control surface, an hydraulic control cylinder, a piston actuated by manually controlled means for movement within said cylinder, an hydraulic servo-cylinder and piston assembly for actuation of said control surface, fluid conduits connecting the respective cylinder ends whereby synchronous movement of said first piston are transmitted to said second piston, rotary pump means for replenishing fluid to said cylinders, and automatic electric means actuated by asynchronous movement of said pistons adapted to impart selective rotation to said pump means and thereby cause said control surface to become synchronized with said manually controlled means.

2. In an hydraulic control system for aircraft having a control surface, an hydraulic control cylinder and piston actuated by manually controlled means, an hydraulic servo-cylinder and piston for actuation of said control surface, fluid conduits connecting the respective cylinder ends whereby synchronous movements of said first piston are transmitted to said second piston, pump and valve means for supplying fluid to said cylinders, automatic electric means actuated by asynchronous movements of said pistons adapted to operate said pump and valve means and to thereby cause said control surface to become synchronized with said manually controlled means.

3. In an hydraulic control system for aircraft, a control cylinder, a piston within said cylinder connected to a control element, a servo-cylinder, a piston within said servo-cylinder connected to a control surface, fluid conduits interconnecting corresponding end portions of said cylinders, a reversible electric pump for corrective replenishment of fluid to said cylinders, and automatic electric means dependent upon relative movement between said pistons adapted to initiate operation of said pump to synchronize said control element with said control surface by said fluid replenishment.

4. In an hydraulic control system for aircraft, a control cylinder, a piston within said cylinder connected to a control element, a servo-cylinder, a piston within said servo-cylinder connected to a control surface, a fluid conduit interconnecting corresponding end portions of said cylinders, a second fluid conduit interconnecting the remaining portions of said cylinders, and automatic means for maintaining synchronism of said control element and surface including a reversibly driven pump adapted to selectively transfer fluid from one to the other of said conduits in response to asynchronous movements of said pistons.

5. In an hydraulic control system for aircraft, a control cylinder, a piston rod movable within said cylinder, a control element for actuating said piston rod, a servo-cylinder, a control surface, a piston rod movable within said servo-cylinder for actuation of said control surface, a fluid conduit interconnecting portions of said cylinders adapted to transmit control forces between opposed faces of said pistons, a fluid conduit connecting the remaining portions of each of said cylinders, a reversible electric-driven pump for replenishment of fluid to the respective conduits, and automatic electric synchronizing means actuated by movement of said first piston and adapted to initiate operation of said pump to supply fluid to either of said conduits for corrected positioning of said servo-piston rod.

6. In an hydraulic control system for aircraft having a control cylinder and piston for hydraulically transmitting control forces to a servo-cylinder and piston connected to a control surface, fluid conduits connecting the respective cylinder ends to provide synchronous piston movements, and automatic electric means, including a pump means, initiated by asynchronous piston movements adapted to compensate for loss of said transmitting fluid by selectively pumping fluid into the respective conduits.

7. In an hydraulic control system for aircraft having a control cylinder and piston for transmitting control forces to a servo-piston and cylinder connected to a control surface, fluid conduits connecting the respective cylinder ends to provide synchronous piston movements, automatic means for synchronizing movements of said control piston and said control surface comprising a synchronous transmitter rotatable upon movement of said control piston, a motor electrically connected for synchronous rotation with said transmitter, generating means for supplying current to said transmitter and motor, a motor-driven pump associated with a solenoid valve, a contact element movable upon rotation of said synchronous motor, dual contacts carried by said servo-piston in circuit with said solenoid valve and with the motor driving said pump, said dual contacts disposed on opposite sides of said movable element adapted to cooperate alternately therewith, whereby uncoordinated movement of said pistons initiates operation of said valve and pump for correcting fluid flow to said cylinders.

8. In a control system for aircraft, a manual control element, a movable element, fluid conduits hydraulically interconnecting said elements for synchronous movements thereof, and fluid compensating means adapted to provide corrective fluid flow into a lagging asynchronous conduit comprising a reversible pump, a source of energy for the operation of said pump, and alternate contact means movable with the movable element and engageable by a contact synchronized with said control element for the selective operation of said pump whereby a synchronous balance is automatically restored within said fluid conduits.

RICHARD W. PALMER.